United States Patent
Bandock, Jr.

(10) Patent No.: US 7,222,430 B1
(45) Date of Patent: May 29, 2007

(54) OBJECT LOCATOR SIGHT

(76) Inventor: Joseph J. Bandock, Jr., P. O. Box 3511, Old Town, ID (US) 83822

( * ) Notice: Subject to any disclaimer, the term of this patent is extended or adjusted under 35 U.S.C. 154(b) by 0 days.

(21) Appl. No.: 11/375,032

(22) Filed: Mar. 15, 2006

(51) Int. Cl.
*G01C 3/00* (2006.01)
*G02B 23/00* (2006.01)

(52) U.S. Cl. .................. 33/276; 33/1 CC; 359/419; 359/803

(58) Field of Classification Search ............ 33/276, 33/277, 268, 1 CC, 562, 563, 566, 613, 645; 434/111, 284, 285, 289; 359/407, 408, 409, 359/419, 802, 803, 372, 373, 375, 377
See application file for complete search history.

(56) References Cited

U.S. PATENT DOCUMENTS

| | | | | |
|---|---|---|---|---|
| 3,613,250 A | * | 10/1971 | Antler | 33/277 |
| 4,417,404 A | * | 11/1983 | Doberschutz | 33/277 |
| 4,478,498 A | * | 10/1984 | Ohno | 359/408 |
| 4,754,552 A | * | 7/1988 | Warren | 33/228 |
| 4,773,747 A | * | 9/1988 | Bresnahan | 359/408 |
| 5,526,574 A | * | 6/1996 | Dash et al. | 33/228 |
| D373,371 S | * | 9/1996 | Chan | D16/133 |
| 5,552,932 A | * | 9/1996 | Schultz | 359/480 |
| 5,926,312 A | * | 7/1999 | Wu | 359/408 |
| 6,020,997 A | * | 2/2000 | Holmes et al. | 359/408 |
| 2004/0211073 A1 | * | 10/2004 | Curry | 33/268 |

* cited by examiner

*Primary Examiner*—Diego Gutierrez
*Assistant Examiner*—Amy R. Cohen
(74) *Attorney, Agent, or Firm*—Keith S. Bergman; William A. Jeckle

(57) ABSTRACT

An object locator sight aiding a first person to communicate the location of a distant object to a second person provides a laterally elongate base, carrying upstanding forward and spacedly adjacent rearward panels. The forward panel is perpendicular to the base and defines objective sight elements inwardly adjacent each end portion. The rearward panel is parallel to the forward panel and defines ocular sight elements inwardly adjacent each end portion. A sight line passing through the aligned first ocular sight element and the first objective sight element is intersected by a sight line passing through the second ocular sight element and the second objective sight element.

10 Claims, 3 Drawing Sheets

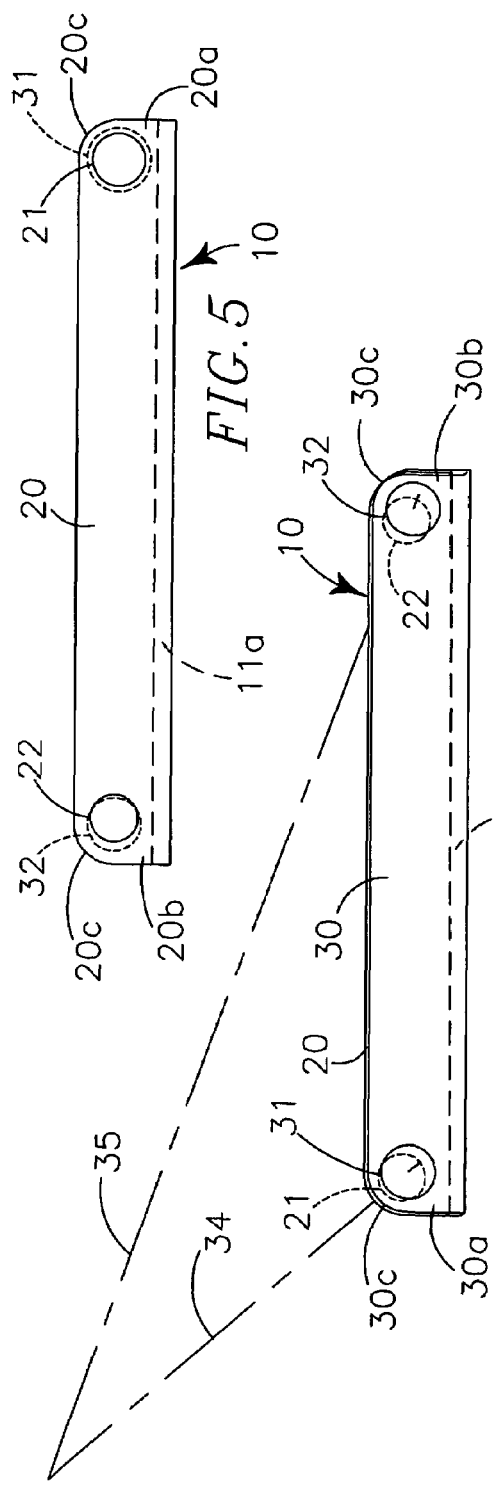
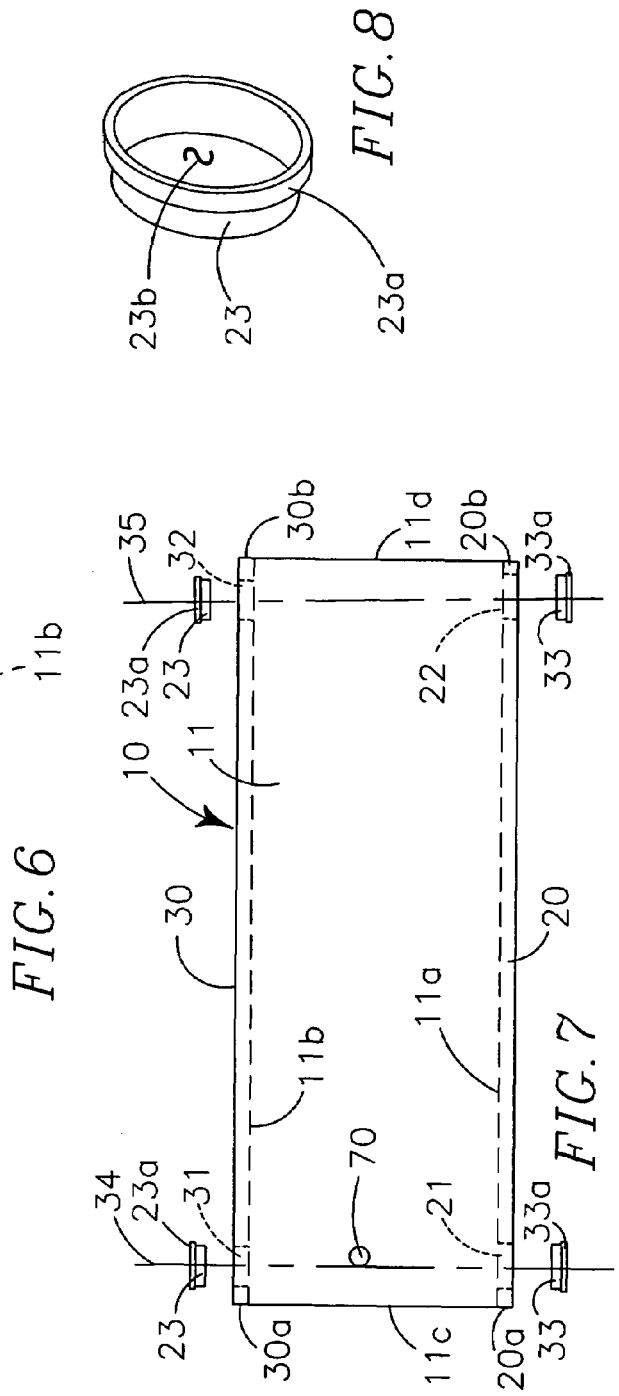

OBJECT LOCATOR SIGHT

BACKGROUND OF INVENTION

1. Related Applications

There are no applications related hereto heretofore filed in this or in any foreign country.

2. Field of Invention

This invention relates to geometrical instruments, and more particularly to an object locator sight for a first person to communicate the location of a distant object to a second person.

BACKGROUND AND DESCRIPTION OF PRIOR ART

People often view distant objects and seek to communicate the location of those distant objects to one or more other people. Distant objects however are generally small, may be camouflaged and blend with surroundings, and may not be stationary, all of which make such communication difficult. Further, the surroundings of the distant object may lack identifiable or describable reference points that may be used for the communication, such as when viewing stars. For these and other reasons, communicating the location of a distant object to another person can be frustrating and at times impossible.

One method to address this problem has been to use a spotting scope supported on a stationary base that is orientated to fix the distant object of interest in the visual field commonly near its center. Following the set up and fixing, a second person looks through the same spotting scope to see the distant object. This method is not well suited for situations when the object's location must be communicated quickly or when the distant object is moving because this method is time-consuming.

A device used to address this problem is comprised of two cooperating telescopes, typically mounted on a single base and mechanically interconnected so that movement of one telescope adjusts the position of the other so that the visual areas of the both telescopes are substantially the same. Such a device is better suited for identifying an object of interest that is moving because the first person can continually adjust the first telescope to focus on the object, although the device has a variety of drawbacks. Such a cooperating telescope device is not well suited for rapid use because it must be set up, it is typically expensive, generally complex with delicate parts that may be easily damaged, and is typically difficult to transport because of its typical large size. As a result, such a cooperating telescope is not practical for use in situations where mobility and rapid use are required, such as in big game hunting and bird watching.

Laser pointers are used to communicate the location of an object to a second person, but they are impractical when the viewer to object distances are great because the reflection point of the beam may be too small to be visualized. Laser pointers therefore are useful only in communicating the location of relatively close objects and in controlled environments.

The present invention seeks to overcome these and similar drawbacks to known methods and devices for communicating the location of a distant object to a second person by providing a small, durable and easy to use handheld object locator sight that allows a first person to quickly and accurately communicate the location of a distant object to a second person.

My object locator sight can be used for a variety of outdoor activities including hunting, bird watching, astronomy, stargazing, photography, and various military uses.

My invention does not reside in any single identified feature but rather in the synergistic combination of all of its structures, which give rise to the functions necessarily flowing therefrom as hereinafter claimed.

SUMMARY

An object locator sight that allows a first person to communicate the location of a distant object to a second person provides an elongate transversely extending base with a forward panel extending orthogonally upwardly from a first forward edge and a similar rearward panel extending orthogonally upwardly from a rearward edge. Each forward and rearward panel defines a pair of elongately spaced sight devices with each pair of sight devices constituted to define substantially the same sight pattern at a distance forwardly of the object locator when each sight member of each spaced pair are in optical alignment. Each sight member may constitute an orifice defined in the respective front and rear panels and at least some orifices may carry inserts defining various sight patterns. Preferably the body is formed of transparent polymeric material for light tunneling and finding effects.

In providing such a device it is:

A principal object to provide an object locator sight device for allowing a first person to communicate the location of a distant object to a second person.

A further object is to provide such a sight that is compact and easily transportable.

A further object is to provide such a sight that may be used in low light conditions.

A further object is to provide such a sight that may be used to communicate the location of a distant moving object to the second person.

A further object is to provide such a sight that is hand-held and may be used without a stationary base.

A still further object is to provide such a sight that may have one or more sight elements defined by holes that may carry removable sight element inserts that are frictionally carried in the sight element holes to aid definition of a sight picture.

A still further object is to provide such a sight that is of new and novel design, of rugged and durable nature, of simple and economic manufacture and one that is otherwise well suited to the uses and purposes for which it is intended.

Other and further objects of my invention will appear from the following specification and accompanying drawings which form a part hereof. In carrying out the objects of my invention, however, it is to be understood that its structures and features are susceptible to change in design and arrangement with only one preferred and practical embodiment of the best known mode being illustrated in the accompanying drawings and specified as is required.

BRIEF DESCRIPTIONS OF DRAWINGS

In the accompanying drawings which form a part hereof and wherein like numbers refer to similar parts throughout:

FIG. 5 is an orthographic front view of the sight of FIG. 1.

FIG. 6 is an isometric forward looking view of the sight of FIG. 1 showing sight lines projected from the sight elements.

FIG. 7 is a bottom view of the sight of FIG. 1.

FIG. 8 is an enlarged isometric view of an annular sight element insert that may be removably carried within hole type sight elements of the sight of FIG. 1.

DESCRIPTION OF PREFERRED EMBODIMENT

As used herein, the term "forward", its derivatives, and grammatical equivalents refers to the portion of the sight that is closest to an object being viewed. The term "rearward", its derivatives, and grammatical equivalents refers to the portion of the sight that is closest to a user. The term "outer", its derivatives and grammatical equivalents refers to a lateral edge portion of the sight as opposed to a laterally medial portion.

Figure 1:
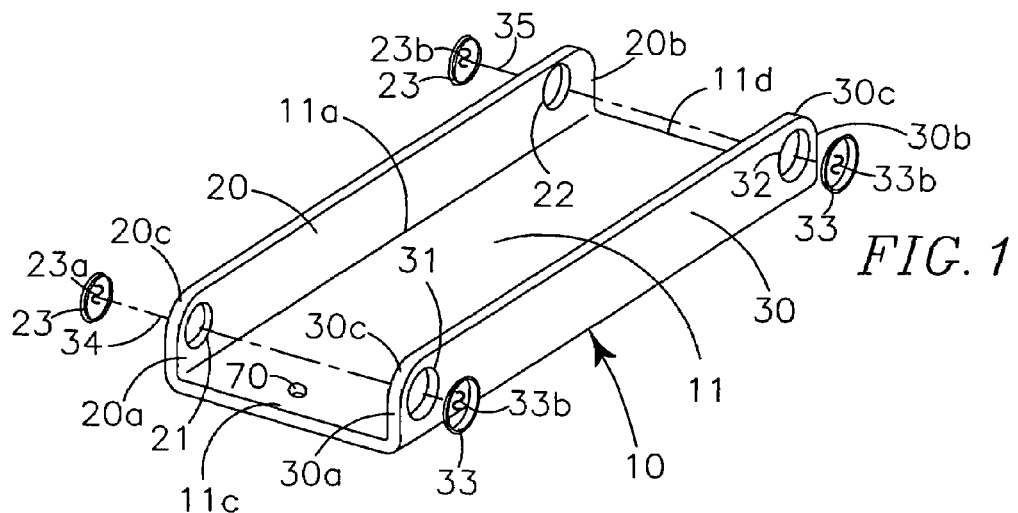
FIG. 1 is an isometric top, rear and left side view of my object locator sight showing sight element inserts removed from the sight elements.
Figure 2:
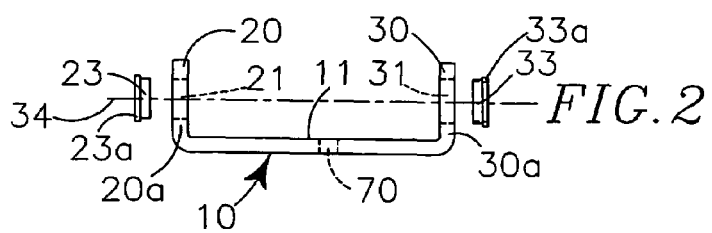
FIG. 2 is an orthographic left side view of the sight of FIG. 1.

As generically shown in FIG. 1, my object locater sight 10 provides a base 11 carrying a forward panel 20 at a forward edge portion 11a, and a rearward panel 30 at a spacedly adjacent rearward edge 11b. The base 11 is generally rectilinear in configuration having opposed outer right end portion 11d and outer left end portion 11c, and defining a lanyard hole 70 spacedly adjacent one outer edge portion 11c, 11d.

The forward panel 20 (FIG. 5) is generally rectilinear having opposed left and right end portions 20a, 20b, respectively with filleted upper corners 20c and is structurally carried at the forward edge 11a of the base 11 to extend upwardly generally perpendicularly thereto. A first objective sight element 21, comprising a circular hole in the instance illustrated in FIG. 5, is defined in the forward panel 20 spacedly adjacent left end portion 20a and a second similar objective sight element 22 is defined in the forward panel 20 spacedly inwardly adjacent the opposed right end portion 20b.

Figure 4:
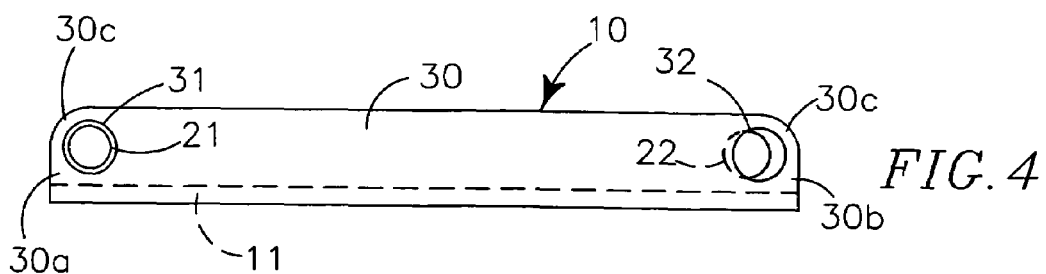
FIG. 4 is an orthographic back view of the sight of FIG. 1 showing the alignment of first ocular sight elements with objective sight elements.

Rearward panel 30 (FIG. 4) is generally rectilinear with opposed left and right end portions 30a, 30b respectively having filleted upper corners 30c and is structurally carried on the rearward edge 11b of the base 11 to extend upwardly generally perpendicularly thereto. A first ocular sight element 31, comprising a circular hole in the instance illustrated in FIG. 4, is defined in rearward panel 30 spacedly adjacent left end portion 30a and a second similar ocular sight element 32 is defined in the rearward panel 30 spacedly inwardly adjacent the opposed right end portion 30b. Although not required, it is preferred that the forward panel 20 and the rearward panel 30 are integrally formed with the base 11 from a single piece of material to eliminate any joints therebetween.

Figure 9A:
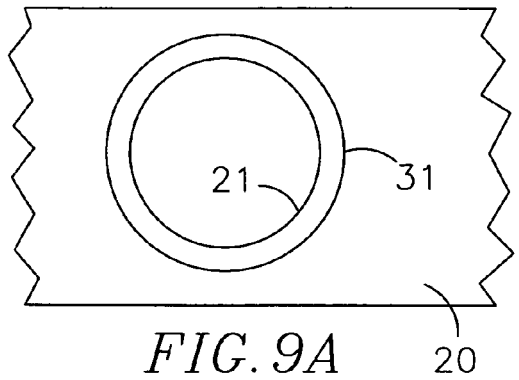
FIG. 9A is an enlarged first preferred embodiment of the sight elements having a circular configuration as viewed by a user having aligned the ocular sight element and the objective sight element.
Figure 9B:
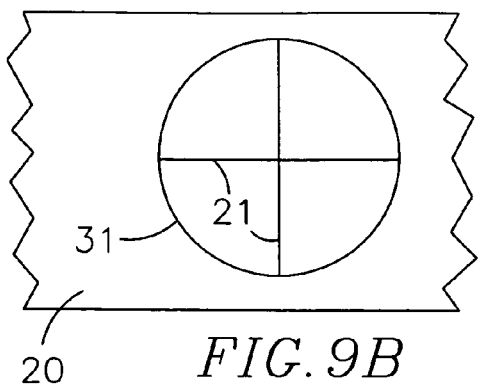
FIG. 9B is an enlarged second embodiment of one sight element having a circular configuration in combination with a second aligned sight element having perpendicular cross hairs.
Figure 9C:
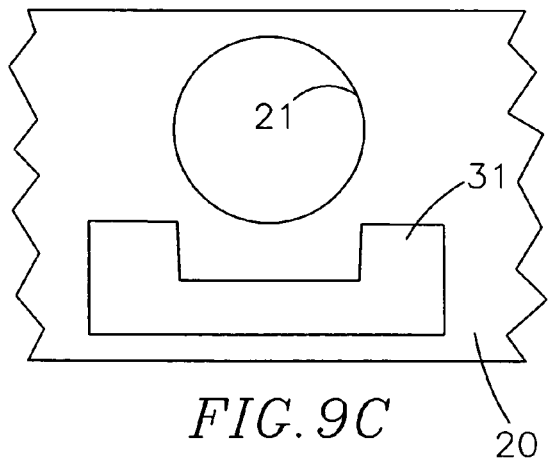
FIG. 9C is an enlarged third embodiment of one sight element defining a circle aligned above a rectilinear notch defined by a second sight element.
Figure 9D:
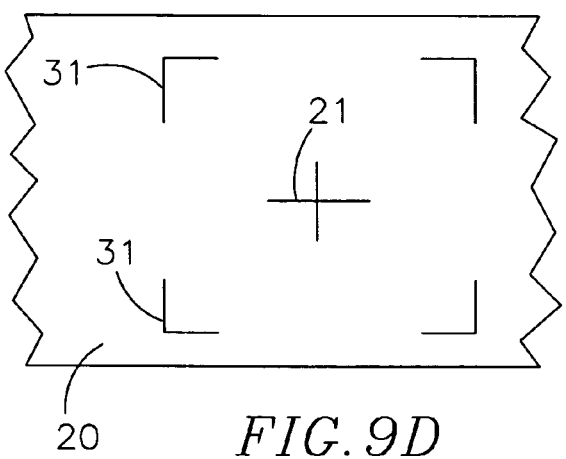
FIG. 9D is an enlarged fourth embodiment of one sight element defining corner elements partially outlining a rectangle with an aligned second sight element defining a cross-centered in the rectangle.
Figure 9E:
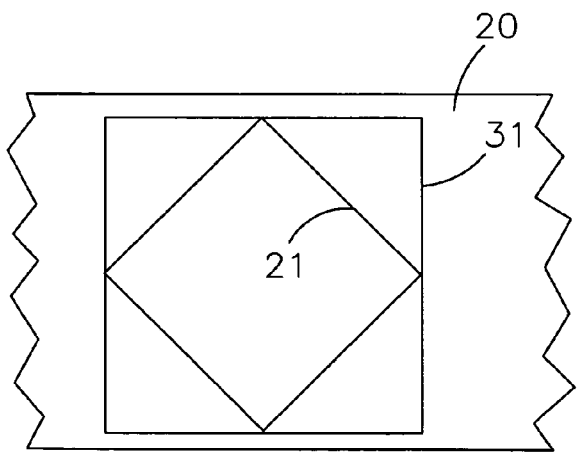
FIG. 9E is an enlarged fifth embodiment of one sight element defining a rectangle with an aligned second sight element defining a smaller inner rectangle rotated 45°.
Figure 9F:
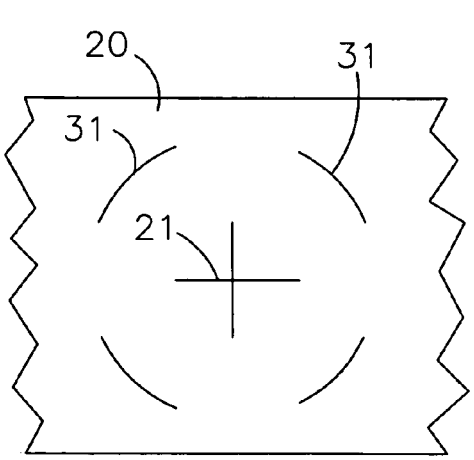
FIG. 9F is an enlarged sixth embodiment of a sight element defining sectors of the circumference of a circle, with an aligned second sight element defining a cross centered in the circle.

The objective sight elements 21, 22 and the ocular sight elements 31, 32 are preferably circular holes defined through the forward panel 20 and rearward panel 30 respectively to form permanent immovable sight means in the panels 20, 30. The objective sight elements 21, 22 and the ocular sight elements 31, 32 also may be etched into the panels, printed upon the panels or both. The objective sight elements 21, 22 and the ocular sights 31, 32 may have configurations other than circles (FIG. 9A), for example a circle and crosshair combination (FIG. 9B), circle and notch combination (FIG. 9C), partially defined square with central cross (FIG. 9D), differently sized centered squares (FIG. 9E) and partially defined circle with a central cross (FIG. 9E). Other open and closed cooperating geometric figures that may be optically aligned with one another are within the spirit and scope of optical and objective sight elements usable with my object locater sight.

The ocular sight elements 31, 32 and the objective sight elements 21, 22 preferably are circular holes defined in the rearward panel 30 and the forward panel 20. The diameter of such circular sight elements preferably is different so that a user can simultaneously visualize both sight elements of a pair by concentrically aligning the peripheries of the elements. In the preferred embodiment the diameter of the ocular sight element 31, 32 is greater than the diameter of the paired objective sight element 21, 22. (FIG. 10A)

In the preferred embodiment having sight elements that are circular holes, removable sight element inserts 23, 33 optionally may be utilized to enhance visual perceptibility. The sight element inserts 23 and 33 may be formed of a colored transparent plastic such as acrylic or polycarbonate, have an exterior configuration similar to the sight elements carrying them and are sized to frictionally engage with the hole type sight element carrying them. Each insert 23, 33 may define a medial channel 23b, 33b or other indicia through which a user's line of sight 34, 35 passes. Preferably a flange 23a may be provided to prevent the sight element insert 23, 33 from passing completely through the carrying sight element. In addition to enhancing visual perception of the sight elements, the sight element inserts 23, 33 aid users in aligning the sight elements. The color of the sight element inserts 23, 33 is preferably a color, such as amber, that not only enhances visual perceptibility of the inserts 23, 33 but also accentuates the visibility of the inserts 23, 33 in low light conditions.

Figure 3:
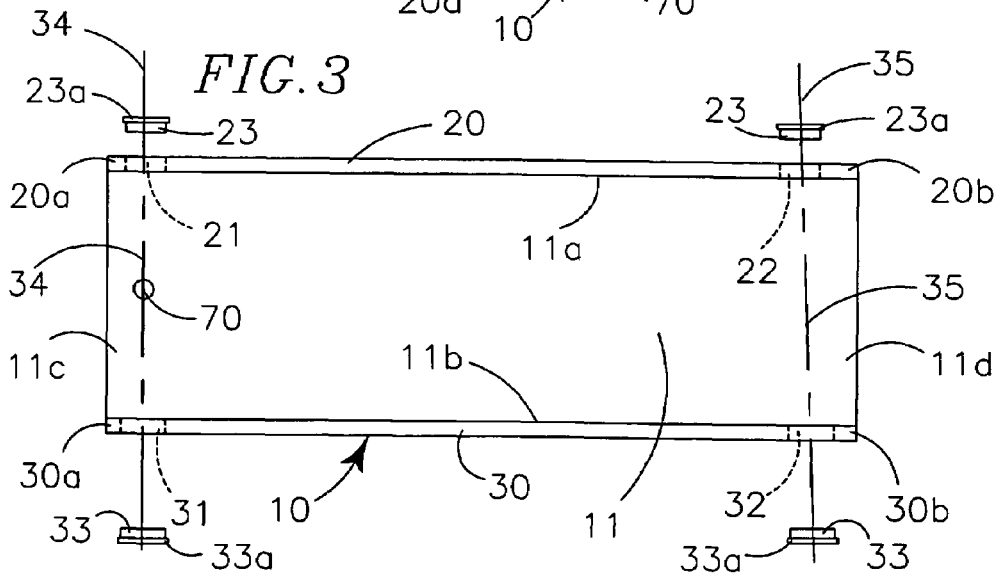
FIG. 3 is plan view of the sight of FIG. 1.

In the preferred embodiment ocular sight element 31 defined in the rearward panel 30 and objective sight element 21 defined in the forward panel 20 are transversely aligned with one another so that a centered line of sight 34 (FIG. 3) passing therethrough is perpendicular to both the forward panel 20 and the rearward 30 panel respectively.

Ocular sight element 32 defined in the rearward panel 30 and objective sight element 22 defined in the forward panel 20 are not aligned parallel to line of sight 34, but rather the objective sight element 22 is offset laterally toward objective sight element 21. The lateral variation in the position of objective sight element 22 causes a centered line of sight 35 (FIG. 6) passing through aligned sight elements 32 and 22 to angulate so that line of sight 35 of the second person intersects line of sight 34 of a first person at a predetermined point spacedly forward of the object locator sight.

Preferably forward panel 20, rearward panel 30 and the base 11 are formed of a transparent plastic such as acrylic, polycarbonate or the like. One characteristic of acrylic, polycarbonate and similar generally polymeric plastics, is that the materials channel light within the structure. When light channeled therein passes into the forward panel 20 or rearward panel 30 defining a sight element 21, 22, 31, 32 a portion of the light is refracted causing the sight element to appear brighter and more visually perceptible to aid in alignment of the sight elements. This characteristic of acrylic, polycarbonate and other similar transparent plastics also causes the sight elements to be more visible and distinct in low light conditions. The objective sight element inserts 23 and the ocular sight element inserts 33, when installed in the objective sight elements 21, 22 and the ocular sight elements 31, 30, further enhance the visual perceptibility of the sight elements 21, 31 and 22, 32 and aid visual alignment thereof.

It is well known that human psychology naturally aids a person to align circles concentrically. The circular configurations of the sight elements 21, 31 and 22, 32 in the preferred embodiment of the instant invention capitalize upon this inherent human characteristic to promote accurate utilization of the object locator sight.

Having described the structure of my object locator sight, its operation may be understood.

A first person who locates the distant object and desires to communicate the location of that distant object to a second person grasps the object locator sight 10 with one hand, preferably with a thumb on the rearward panel 30 between the two spacedly adjacent ocular sight elements 31, 32 and a finger on the forward panel 20 between the two spacedly adjacent objective sight elements 21, 22. The sight 10 is held at arm's length while the first person manually moves the sight to sight the object of interest through ocular sight element 31 and objective sight element 21 by placing the object of interest in the center of the visual field defined by the peripheries of the aligned sight elements 31 and 21 respectively. The second person, in a position adjacent and to the right of the first person for use of the sight of FIG. 6, looks through ocular sight element 32 and objective sight element 22 and moves himself or herself to align the peripheries of the sight elements 32, 22. The visual field defined by the aligned peripheries of the sight elements 32, 22 then directs the second person's line of sight 35 to the object and area being sighted by the first person.

The foregoing description of my invention is necessarily of a detailed nature so that a specific embodiment of a best mode may be set forth as is required, but it is to be understood that various modifications of details and rearrangement, substitution and multiplication of parts may be resorted to without departing from its spirit, essence or scope.

Having thusly described my invention, what I desire to protect by Letters Patent, and

What I claim is:

1. An object locator sight to allow a first person to communicate the location of a distant object to a second person, comprising in combination:
   a laterally elongate base having a first forward edge and a second substantially parallel rearward edge;
   a forward panel carried at the first forward edge of the base to extend upwardly therefrom, the forward panel defining a first objective sight means and a laterally spacedly adjacent second objective sight means;
   a rearward panel carried at the second rearward edge of the base to extend upwardly therefrom and substantially parallel to the forward panel, the rearward panel defining a first ocular sight means and a laterally spacedly adjacent second ocular sight means; wherein
   the ocular sights and the objective sights have optical centers through which a line of sight passes,
   the optical centers of the ocular sights and the objective sights are coplanar, and
   a first line of sight passing through the first ocular sight means and the first objective sight means and a second line of sight passing through the second ocular sight means and the second objective sight means are not parallel.

2. The object locator sight of claim 1 wherein:
   the optical center to center distance between the first ocular sight means and the second ocular sight means is greater than the optical center to center distance between the first objective sight means and the second objective sight means so that the first line of sight and the second line of sight intersect at some predetermined point forwardly of the object locator.

3. The object locator sight of claim 1 wherein:
   the line of sight between the first ocular sight means and the first objective sight means is perpendicular to the forward and rearward panels; and
   the optical center to center distance between the first ocular sight means and the second ocular sight means is greater than the optical center to center distance between the first objective sight means and the second objective sight means.

4. The object locator sight of claim 1 wherein:
   the sight means are holes defined through the forward panel and rearward panel.

5. The object locator sight of claim 4 further comprising:
   a sight element insert having an exterior configuration similar to the sight means releasably carried within at least one of each pair of ocular and objective sight means; and
   each sight element insert having a color different from the color of the forward panel and the rearward panel.

6. The object locator sight of claim 1 wherein:
   the sight means are etched into the forward panel and the rearward panel.

7. The object locator sight of claim 1 wherein:
   the sight means are printed on the forward panel and the rearward panel.

8. The object locator sight of claim 1 wherein:
   the sight means are circular.

9. The object locator sight of claim 1 wherein:
   at least one of the sight means of each cooperating pair of objective and ocular sight elements comprise perpendicularly intersecting lines.

10. An object locator sight to allow a first person to communicate the location of a distant object to a second person, comprising in combination:
    a laterally elongate base having a first forward edge and a second substantially parallel rearward edge;
    a first forward panel carried at the first forward edge of the base to extend upwardly therefrom, the first forward panel defining a first objective sight means and a laterally spacedly adjacent second objective sight means, wherein the first objective sight means and the second objective sight means are circular through holes defined through the forward panel;

a second rearward panel carried at the second rearward edge of the base to extend upwardly therefrom and substantially parallel to the first forward panel, the second rearward panel defining a first ocular sight means and a laterally spacedly adjacent second ocular sight means, wherein the first and second ocular sight means are circular holes a really larger than the first and second objective sight means; and a sight element insert having an exterior configuration similar to the sight means releasably carried within at least one of each cooperating pair of ocular and objective sight means, the sight element insert having a color different from the color of the forward panel and the rearward panel; wherein the ocular sights and the objective sights have optical centers, through which a line of sight passes, that are coplanar, and a first line of sight passing through the first ocular sight means and the first objective sight means and a second line of sight passing through the second ocular sight means and the second objective sight means converge.

* * * * *